(12) United States Patent
Villata et al.

(10) Patent No.: US 7,395,143 B2
(45) Date of Patent: Jul. 1, 2008

(54) TRANSMISSION SYSTEM WITH A CONTINUOUSLY VARIABLE TRANSMISSION RATIO

(75) Inventors: Franco Villata, Turin (IT); Antonino Fratta, Turin (IT); Alfredo Vagati, Venaria Reale (IT); Gian Mario Pellegrino, Turin (IT); Angela Del Gobbo, Turin (IT); Liborio Tarquinio, Villetta Barrea (IT); Stefano Re Fiorentin, Grugliasco (IT)

(73) Assignee: CRF Societa Consortile per Azioni, Orbassano (Turin) (IT)

( * ) Notice: Subject to any disclaimer, the term of this patent is extended or adjusted under 35 U.S.C. 154(b) by 780 days.

(21) Appl. No.: 10/498,556

(22) PCT Filed: Dec. 11, 2002

(86) PCT No.: PCT/EP02/14094

§ 371 (c)(1),
(2), (4) Date: Jun. 14, 2004

(87) PCT Pub. No.: WO03/051660

PCT Pub. Date: Jun. 26, 2003

(65) Prior Publication Data

US 2005/0085975 A1   Apr. 21, 2005

(30) Foreign Application Priority Data

Dec. 14, 2001   (IT)   ............ TO2001A1171

(51) Int. Cl.
*G06F 17/00* (2006.01)

(52) U.S. Cl. ............ 701/54; 701/102; 701/110; 701/114; 701/22; 701/24; 180/65.1; 180/65.2; 180/65.4; 318/139; 318/148

(58) Field of Classification Search ......... 701/102, 701/110, 114, 22, 24, 84, 54, 4; 180/65.1, 180/65.2, 65.4; 318/139, 148

See application file for complete search history.

(56) References Cited

U.S. PATENT DOCUMENTS 4,862,009 A * 8/1989 King ............ 290/22

(Continued)

FOREIGN PATENT DOCUMENTS

EP   0 856 427 A1   8/1998

*Primary Examiner*—Khoi H. Tran
*Assistant Examiner*—Marie A Weiskopf
(74) *Attorney, Agent, or Firm*—Sughrue Mion, PLLC

(57) ABSTRACT

The system (CVT) includes a first electrical machine (M1) with a first rotor (R1) provided with a multiphase winding (W1) and fixed firmly to the shaft (1) of the internal combustion engine (ICE) and a second rotor (R2) or intermediate rotor coaxial with the first rotor (R1) and carrying first magnetic means (PM1) operatively cooperating with the winding (W1) of the first rotor (R1), the intermediate rotor (R2) being coupled with at least one axle (2) of the motor vehicle, and a second rotary electrical machine (M2) coaxial with the first (M1) and including a stator (ST), which is arranged on the opposite side of the intermediate rotor (R2) to the first rotor (R1) and is provided with a multiphase winding (W2), as well as the intermediate rotor (R2) which also carries second magnetic means operatively cooperating with the winding (W2) of the stator (ST), a first inverter and a second inverter (I1, I2) of which the a.c. sides are connected to the winding (W1) of the rotor (R1) and to the winding (W2) of the stator (ST), respectively, and the respective d.c. sides are connected in parallel with one another by means of a d.c. voltage link (L), sensors (S1-Sn) suitable for providing electrical signals indicative of predetermined parameters relating to predefined operating conditions of the internal combustion engine (ICE) and of the motor vehicle, and an electronic control unit (ECU) connected to the sensors (S1-Sn) and to the inverters (I1, I2) and arranged to control the operation of the inverters (I2, I2) in a manner such that, after the engine (ICE) has been started, the voltage (VDC) in the d.c. voltage link (L) is regulated to a predetermined value which is variable in accordance with predetermined procedures in dependence on the values of the parameters monitored by the sensors (S1-Sn).

22 Claims, 17 Drawing Sheets

U.S. PATENT DOCUMENTS 5,220,264 A * 6/1993 Yamada .................. 318/599
6,018,694 A * 1/2000 Egami et al. ............. 701/102
6,219,259 B1   4/2001 Hubert et al.

* cited by examiner

TRANSMISSION SYSTEM WITH A CONTINUOUSLY VARIABLE TRANSMISSION RATIO

The present invention relates to a transmission system with a continuously variable transmission ratio, particularly for a motor vehicle provided with an internal combustion engine.

The transmission system with a continuously variable transmission ratio according to the invention comprises:

a first rotary electrical machine including a first rotor provided with a winding and fixed for rotation with the shaft of the internal combustion engine and a second rotor or intermediate rotor arranged coaxially with the first rotor and carrying first magnetic means operatively cooperating with the winding of the first rotor, the intermediate rotor being coupled mechanically with at least one axle of the motor vehicle, and a second rotary electrical machine coaxial with the first, and formed by a stator, arranged on the opposite side of the intermediate rotor to the first rotor and provided with a multiphase winding, and by the intermediate rotor which also carries second magnetic means operatively cooperating with the winding of the stator, a first inverter and a second inverter (for example, so-called VSIs—voltage-supplied inverters), having respective alternating-current sides connected to the winding of the first rotor and to the winding of the stator, respectively, and respective direct-current (or d.c.) sides connected in parallel with one another by means of a so-called d.c. voltage link, sensor means suitable for providing electrical signals indicative of the values adopted by a plurality of parameters indicative of predefined operating conditions of the internal combustion engine and of the motor vehicle, and electronic control means connected to the sensor means as well as to the inverters and arranged to control the operation of the inverters in a manner such that, after the internal combustion engine has been started, the voltage in the so-called d.c. voltage link is regulated to a predetermined value which is variable in accordance with predetermined procedures in dependence on the values of the parameters monitored-by the sensor means.

In transmission systems of the prior art with continuously variable transmission ratios such as, for example, the system described in European patent application EP 0 856 427-A1, the two above-mentioned inverters have their respective direct-current sides connected permanently to a storage battery. The voltage on the direct-current side of these inverters is thus set by the battery. However, in operation, the overall voltage supplied by a storage battery of this type is in practice variable appreciably with a ratio between the minimum value and the maximum value which may be in the vicinity of 1:2. In these systems of the prior art, in order to be able to ensure the desired performance, the inverters must be of a size such as to ensure the desired power output even when the voltage supplied by the storage battery adopts a predetermined minimum value. Moreover, during normal operation, the voltage supplied by the storage battery is generally greater or even much greater than the minimum value. The electronic switches of the inverters therefore have to be considerably oversized, with consequent penalties in terms of cost and operative efficiency and an increase in energy losses.

Amongst other things, the transmission system with a continuously variable transmission ratio according to the invention as defined above overcomes these disadvantages of the systems according to the prior art and improves the efficiency of the electromagnetic parts of the system.

Further characteristics and advantages of the invention will become clear from the following detailed description which is given purely by way of non-limiting example with reference to the appended drawings, in which:

FIG. 1 is a schematic view of a transmission system with a continuously variable transmission ratio according to the invention, FIG. 2 is a series of graphs showing examples of curves of torques or twisting moments which can be generated in the system of FIG. 1, FIG. 3 is a schematic view of a variant of the transmission system with a continuously variable transmission ratio according to the invention, FIG. 3a is a schematic view which shows an embodiment of a portion of the system of FIG. 3, FIG. 4 is a graph showing examples of curves of torques or twisting moments which can be generated in the system according to FIG. 3, FIG. 5 is a schematic view of a torque converter with interpenetrating electrical machines, FIGS. 6 to 10 are partial views showing, in partial cross-section, five different embodiments of a torque converter according to the invention, FIG. 11 is a partial view, on an enlarged scale, of an inner rotor of a torque inverter according to FIG. 10 provided with so-called "false slots", FIG. 12 is a schematic view showing an inner rotor for a system according to the invention, in axial section, FIG. 13 is a cross-section through the rotor of FIG. 12, on an enlarged scale, FIG. 14 is a schematic view of a system according to the invention used for starting an internal combustion engine, FIG. 15 is a series of graphs which show curves of angular velocities and torques in a system according to FIG. 14 as functions of time which is given on the abscissa, and FIGS. 16 and 17 are further graphs which show curves of angular velocities, positions, and torques of another system according to the present invention, as functions of time which is given on the abscissa.

In FIG. 1, an internal combustion engine of a motor vehicle, for example, a four-stroke engine with four cylinders in line is indicated ICE. The engine has an output shaft 1 which is coupled with an axle 2 of a motor vehicle (not shown further) in the manner which will be described below.

The axle 2 comprises, in known manner, a differential 3 to the driven shafts of which respective axle-shafts 4, associated with respective wheels 5, are connected, in a per se known manner.

The shaft 1 of the combustion engine ICE is coupled with the axle 2 by means of a transmission system with a continuously variable transmission ratio, generally indicated CVT.

The transmission system CVT comprises, substantially, two coaxial rotary electrical machines M1 and M2.

In the embodiment shown in the drawings, the rotary electrical machine M1 is inside the rotary electrical machine M2 and comprises a first rotor R1 or inner rotor, provided with a multiphase winding W1. This winding is, for example, a three-phase winding. The rotor R1 has a shaft fixed for rotation with the output shaft 1 of the internal combustion engine ICE.

The rotary electrical machine M1 further comprises a second rotor R2, or intermediate rotor. This rotor has a substantially annular shape and is arranged coaxially around the inner rotor R1.

The intermediate rotor R2 has, in the vicinity of its inner surface, an arrangement of permanent magnets PM1 operatively cooperating, that is, interacting with the winding W1 of the inner rotor R1.

The intermediate rotor R2 is, in a sense, shared with the outer rotary electrical machine M2, which also comprises an annular stator ST coaxial with the rotors R1 and R2. The stator ST has a multiphase winding W2. This winding may be, in particular, a three-phase winding.

The radially outermost portion of the intermediate rotor R2, which may also be provided with permanent magnets, cooperates operatively, that is, interacts with the stator ST.

The intermediate rotor R2 is coupled to the input shaft of the differential 3 of the axle 2 by means of a bell-like element BF and optionally by a reducer SR.

A first inverter and a second inverter (or alternating-current/direct-current converter) for example, of the above-mentioned VSI type, are indicated I1 and I2 and have their respective alternating-current sides connected to the winding W1 of the inner rotor R1 and to the winding W2 of the stator ST, respectively.

The alternating-current side of the inverter I1 is connected to the winding W1 of the inner rotor R1 by means of a plurality of brushes B that are in sliding contact with corresponding rings R which are carried by the shaft of the rotor R1 and are connected to the individual phases of the winding W1 in a per se known manner, not shown.

The inverters I1 and I2 have their respective direct-current sides interconnected by means of a d.c. connection or voltage link L comprising a pair of conductors. At least one capacitive element is arranged in parallel between the connecting conductors L between the two inverters, in a per se known manner; this capacitive element is essential for the operation of the inverters. The capacitive element may be constituted by two capacitors C1 and C2 each physically incorporated in one of the two inverters I1 and I2 in parallel with the terminals of the respective direct-current side, or by equivalent arrangements.

An electronic control unit, comprising, for example, a microprocessor, is indicated ECU.

A plurality of sensors S1, S2, . . . , Sn, are connected to this unit and can supply thereto electrical signals indicative of operating conditions of the internal combustion engine ICE and/or of the motor vehicle. The sensor S1 may, for example, be a sensor which can supply signals indicative of the rate of rotation $\omega_{ICE}$ of the shaft 1 of the internal combustion engine ICE. The sensor S2 may be, for example, a sensor which can supply electrical signals indicative of the speed of forward movement of the motor vehicle.

Further sensors may supply the unit ECU with signals for defining the instantaneous value of the power $P_{ICE}$ delivered by the internal combustion engine ICE, etc.

The electronic control unit ECU is also connected to the conductors of the d.c. connection or voltage link L between the direct-current sides of the inverters I1 and I2 so as to be able to detect the instantaneous value of the voltage $V_c$ in the d.c. link L in operation.

The unit ECU may be arranged in general to control the engine ICE, to drive the inverters I1 and I2 for the control of the transmission system CVT, and to coordinate these control and driving functions in accordance with predetermined procedures.

The unit is arranged, in particular, to drive the inverters I1 and I2 in a manner such that, after the internal combustion engine ICE has been started, the voltage $V_c$ in the connection L is regulated to a predetermined value which is variable in accordance with predetermined procedures in dependence on the values of the parameters monitored by the sensors S1-Sn, in particular in dependence on the speed of rotation $\omega_{ICE}$ of the shaft 1 of the internal combustion engine ICE, on the instantaneous speed of forward movement of the motor vehicle, and on the instantaneous value of the power $P_{ICE}$ delivered by the internal combustion engine.

In operation, after the internal combustion engine has been started, respective electromotive forces are developed in the windings W1 and W2 of the transmission system CVT; the amplitudes of these forces depend on the intensities of the currents which the inverters I1 and I2 control in the windings W1 and W2.

If the powers exchanged by the windings W1 and W2 with the associated inverters I1 and I2, respectively, are referred to as $P_1$ and $P_2$ and if the powers dissipated in the switches of the inverters I1 and I2 are indicated $P_{d1}$, and $P_{d2}$, the power $P_{DC}$ which is developed in the d.c. link L and stored in the capacitive element C=C1+C2 is equal to:

$$P_{DC}=(P_1+P_2)-(P_{d1}+P_{d2}) \qquad (1)$$

It can be seen from the equation given above that, by controlling conduction in the electronic switches of the two inverters I1 and I2 (in an on-off manner), the electronic control unit ECU can control the power $P_{DC}$ in the d.c. link L in a manner such that the voltage in the d.c. link corresponds to a predetermined value based on the operating point of the system, the operating point being defined, for example, as already stated above, by the values of the speed of rotation $\omega_{ICE}$ of the shaft 1 of the internal combustion engine, by the speed of advance of the motor vehicle, and by the power $P_{ICE}$ delivered by the engine.

By virtue of this characteristic, the variable-ratio transmission system according to the invention can ensure the delivery of maximum performance (power output in conditions of maximum difference in speed, as an absolute value, between the shaft 1 of the engine ICE and the output shaft BF of the transmission system CVT) at values close or equal to the maximum value $V_{DC,MAX}$ of the voltage $V_{DC}$ in the d.c. link L. The electronic switches of the inverters I1 and I2 can thus have dimensions that are more favourable from an economic point of view if the voltage of best utilization of the switches is arranged to correspond to the value $V_{DC,MAX}$.

The variable-ratio transmission system CVT of FIG. 1 may be defined as "autonomous" since no external supply-voltage source is connected to the connection L between the direct-current sides of the two inverters I1 and I2.

The electronic control unit ECU can, in particular, be arranged to drive the inverters I1 and I2 in a manner such that, for each operating point, the voltage $V_{DC}$ in the d.c. link L is regulated to the minimum value necessary to impart the desired current values to the windings W1 and W2.

The power dimensions of the variable-ratio transmission system CVT can be related substantially to three basic parameters:

the maximum mechanical power $P_{ICE,MAX}$ delivered by the internal combustion engine ICE, the speed $\omega_{ICE,MAX}$ of the shaft 1 of the internal combustion engine ICE at which the maximum power $P_{ICE,MAX}$ is delivered, and the value of the ratio r between the values at the extremes of the range of speeds for which it is intended to be able to deliver the maximum power to the wheels; this ratio, which is known as the "constant power" ratio, is expressed, at the output of the CVT (the intermediate rotor R2), as the ratio between the maximum angular velocity $\omega_{MAX}$ and the "basic" or minimum angular velocity between which the maximum power $P_{ICE,MAX}$ is to be delivered by the internal combustion engine ICE:

$$r=\omega_{MAX}/\omega_{base} \qquad (2)$$

For the purposes of the selection of the dimensions of the transmission system CVT, it is useful to define the following further parameter b (also known as the velocity boost):

$$b = \omega_{MAX}/\omega_{ICE,MAX} \quad (3)$$

where $\omega_{MAX}$ has the meaning already defined above and $\omega_{ICE,MAX}$ is the rate of rotation of the shaft of the internal combustion engine ICE at which the maximum power $P_{ICE,MAX}$ is delivered.

With the use of the ratios r and b, the maximum torque $T_{OUT,MAX}$ at the output of the system CVT can be expressed as follows:

$$T_{OUT,MAX} = T_{ICE,MAX} \cdot \frac{r}{b} \quad (4)$$

Tests and investigations carried out by the inventors have identified a criterion for the selection of the dimensions of the system CVT which can minimize the production cost of the inverters I1 and I2 and of the entire system CVT. This criterion can easily be expressed as a function of the above-defined ratios b and r.

The criterion requires simply that the following be substantially true:

$$b_{opt} \approx 2r/(r+1) \quad (5)$$

Figures 3, 3A:
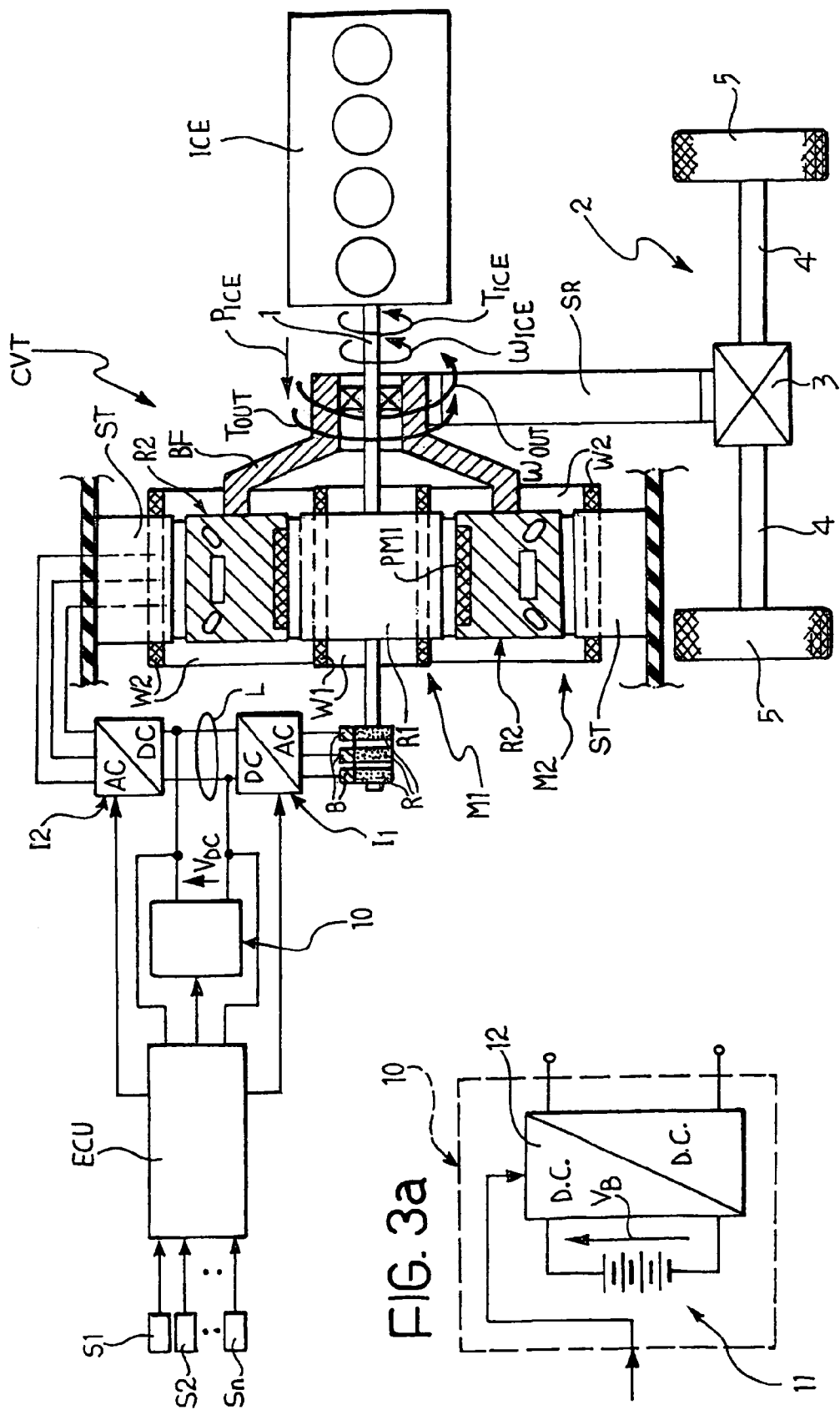
FIG. 3 shows a variant of the system described above with reference to FIG. 1.

In FIG. 3, parts and elements which have already been described have again been attributed the same alphabetical and/or numerical reference symbols.

In the variant of FIG. 3, an auxiliary electrical-energy storage system, generally indicated 10, is connected to the d.c. link L. As can be seen in FIG. 3a, this storage system comprises a plurality of electrical accumulators 11 and a bidirectional d.c./d.c. converter 12 which is controlled by the unit ECU in a manner such that the voltage in the d.c. link L is regulated according to the operating point, as described above.

The converter 12 may be of the so-called "buck-boost" type, or of the "step-up" type.

In the latter case, the range of regulable variation of $V_{DC}$ is reduced to the range $V_B \div V_{DC,MAX}$ but the converter 12 can be produced decidedly more economically.

The interfacing with the electrical-energy storage system enables the performance characteristics of the system to be improved considerably for given dimensions of the electromechanical portion, but limits the power exchanged with the storage system and hence the cost of the d.c./d.c. converter 12.

The availability of auxiliary electrical energy, even only in a transitory manner, can result in a corresponding increase in the maximum power which can be delivered to the wheels, in particular for angular velocities greater than $\omega_{base}$.

The strategies for the management of the transitory exchange of electrical power with the auxiliary storage system depend greatly on the characteristics and on the charge state of the accumulators used, as well as on the characteristics of the internal combustion engine ICE.

Figure 1:
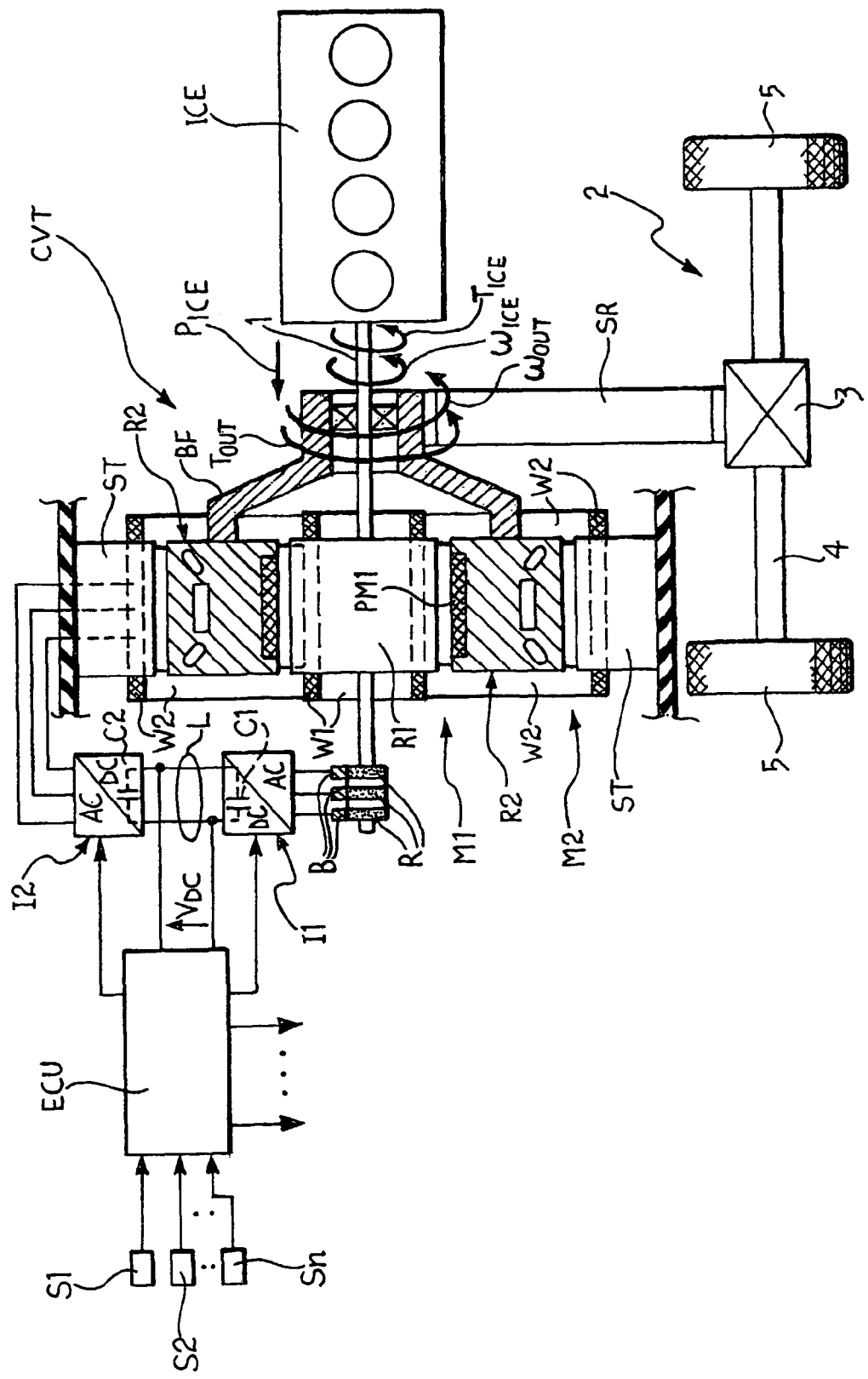
Figure 2:
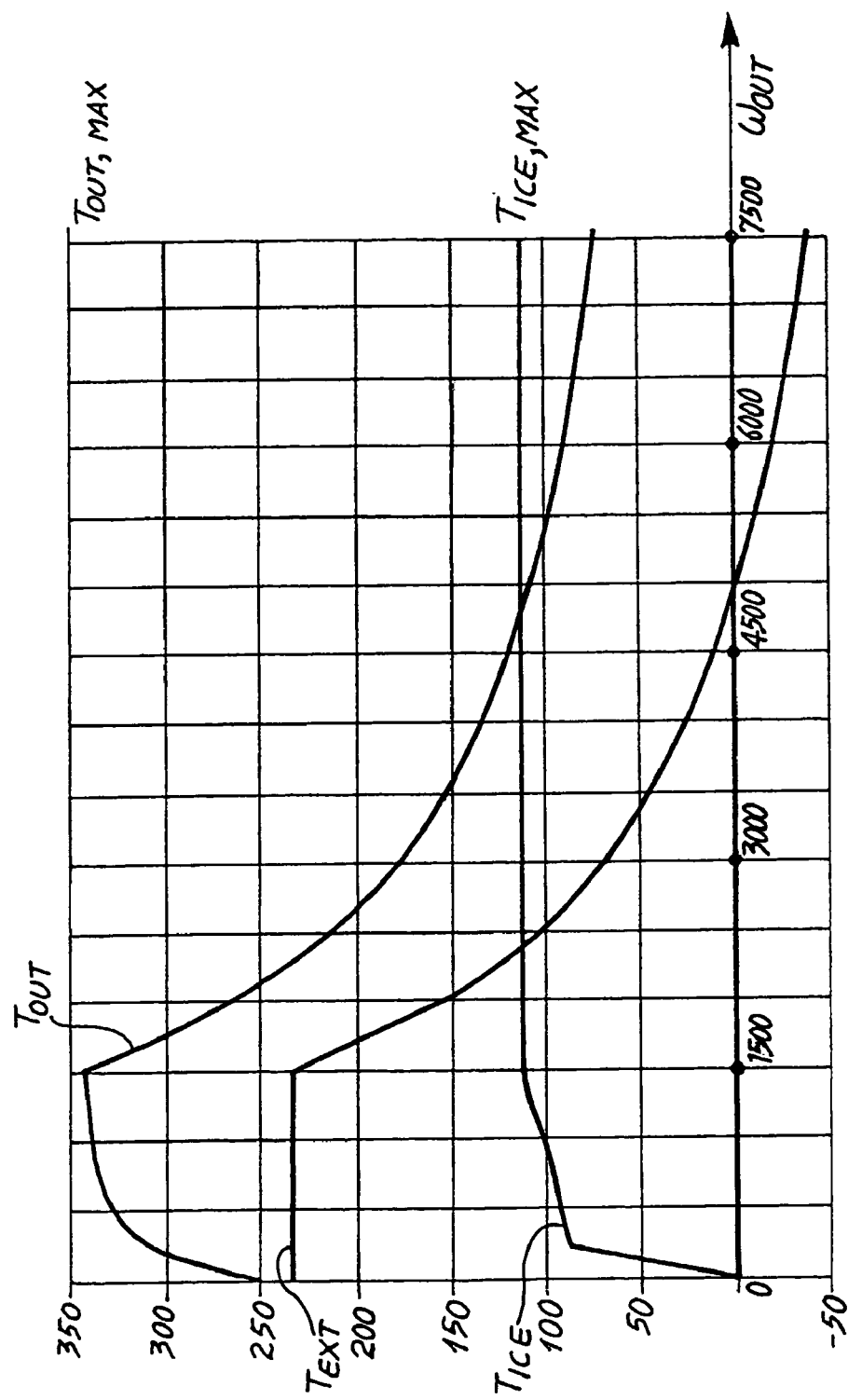
FIG. 2 shows, as a function of the rate of rotation $\omega_{OUT}$, the curve of the output torque $T_{OUT}$ of the transmission system CVT corresponding to the curves, shown therein, of the torque $T_{ICE}$ output by the internal combustion engine ICE and of the torque $T_{EXT}$ applied to the intermediate rotor R2 across the air gap defined between the rotor R2 and the stator ST.
Figure 4:
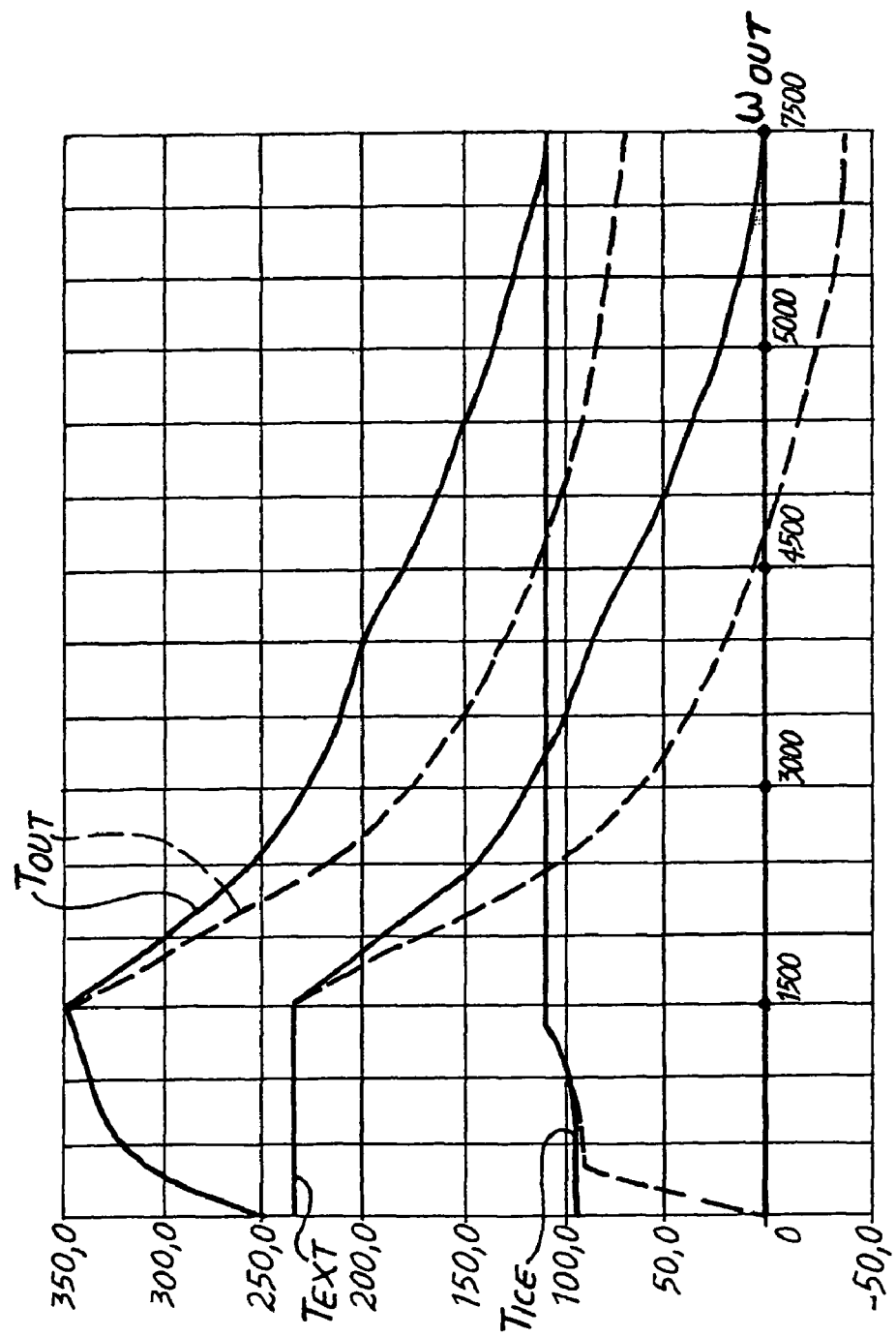

It is thus possible to achieve torque characteristics of the type shown in FIG. 4 in which the broken lines show the curves corresponding to the torques $T_{ICE}$, $T_{EXT}$, and $T_{OUT}$ of the graph of FIG. 2, that is, relating to the system of FIG. 1, which does not have the auxiliary storage system.

Figure 5:
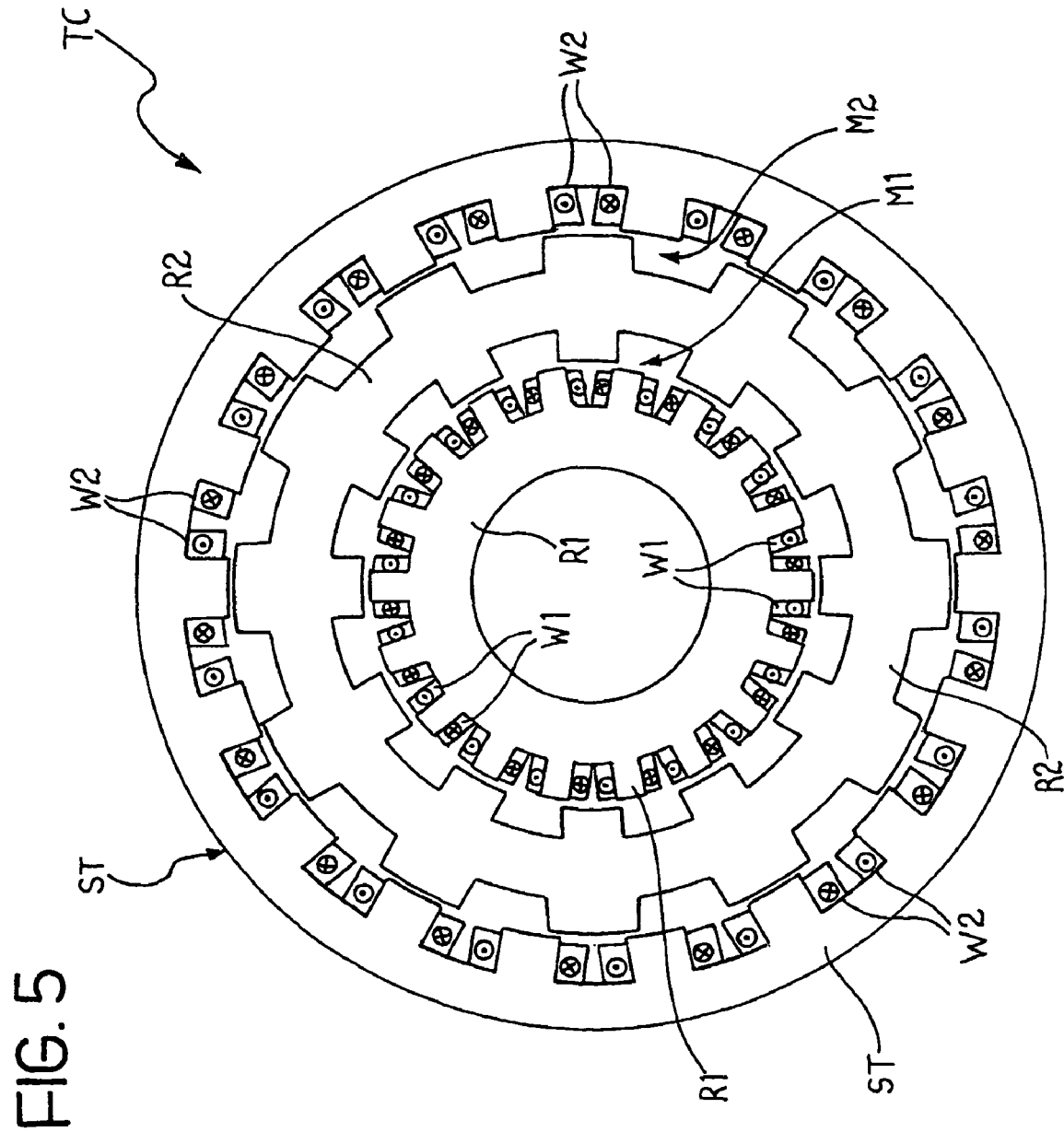

FIG. 5 shows a variant. In this drawing, parts and elements which have already been described have again been attributed the same alphabetical and/or numerical references that were used above.

In a torque transmission system with interpenetrating electrical machines according to the invention, the first machine M1 and the second machine M2 are advantageously machines of the reluctance type.

In particular, one or other or both of these machines M1, M2 may be of the so-called "switched reluctance" type. An example is shown in FIG. 5 in which both the inner machine M1 and the outer machine M2 are of this type.

In other embodiments, the first and/or the second electrical machine are of the synchronous or variable reluctance type. An example is shown in FIG. 6 in which the intermediate rotor R2 is formed in a manner such that both of the machines M1 and M2 are of the synchronous reluctance type.

Figure 6:
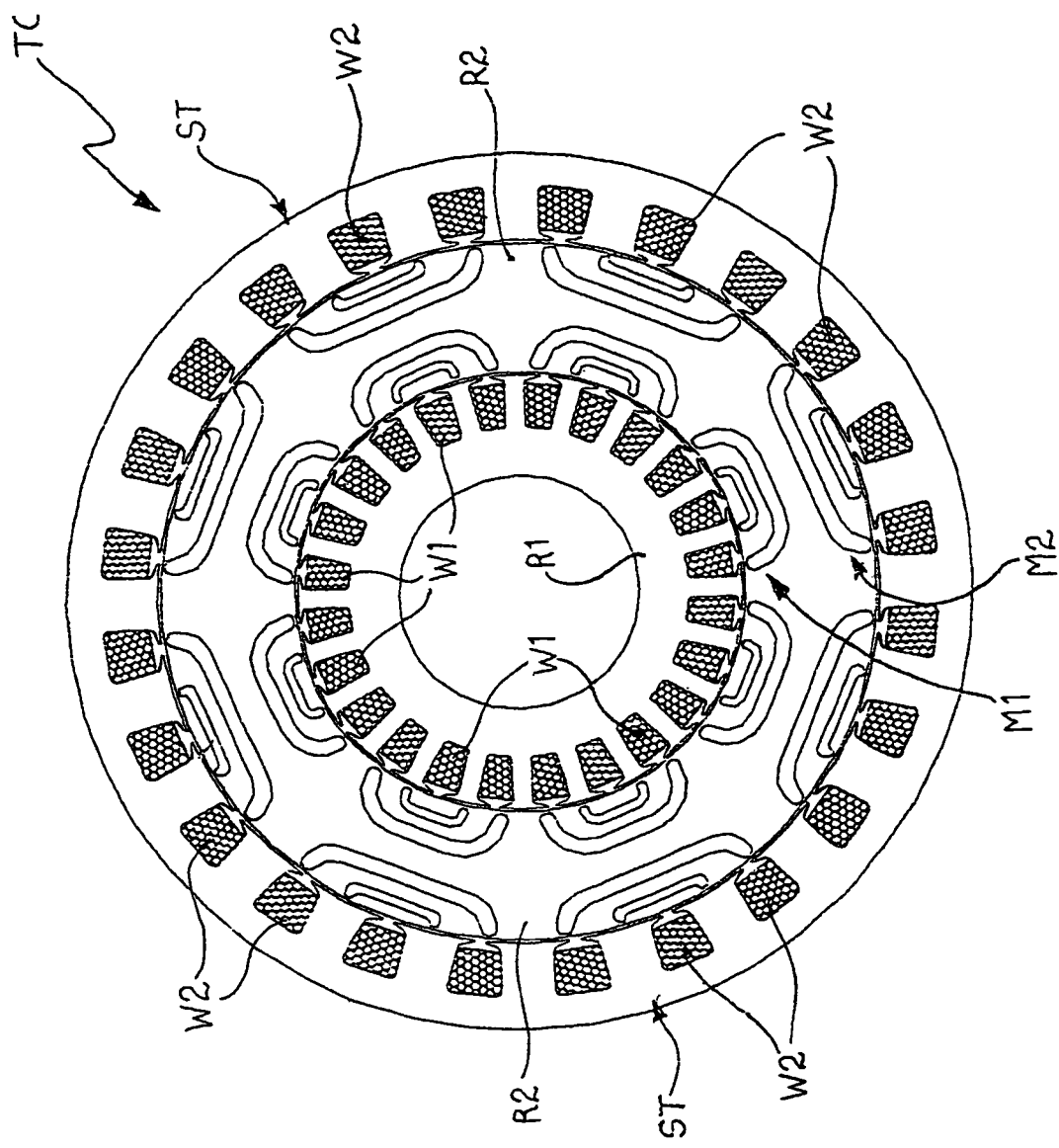
Figure 7:
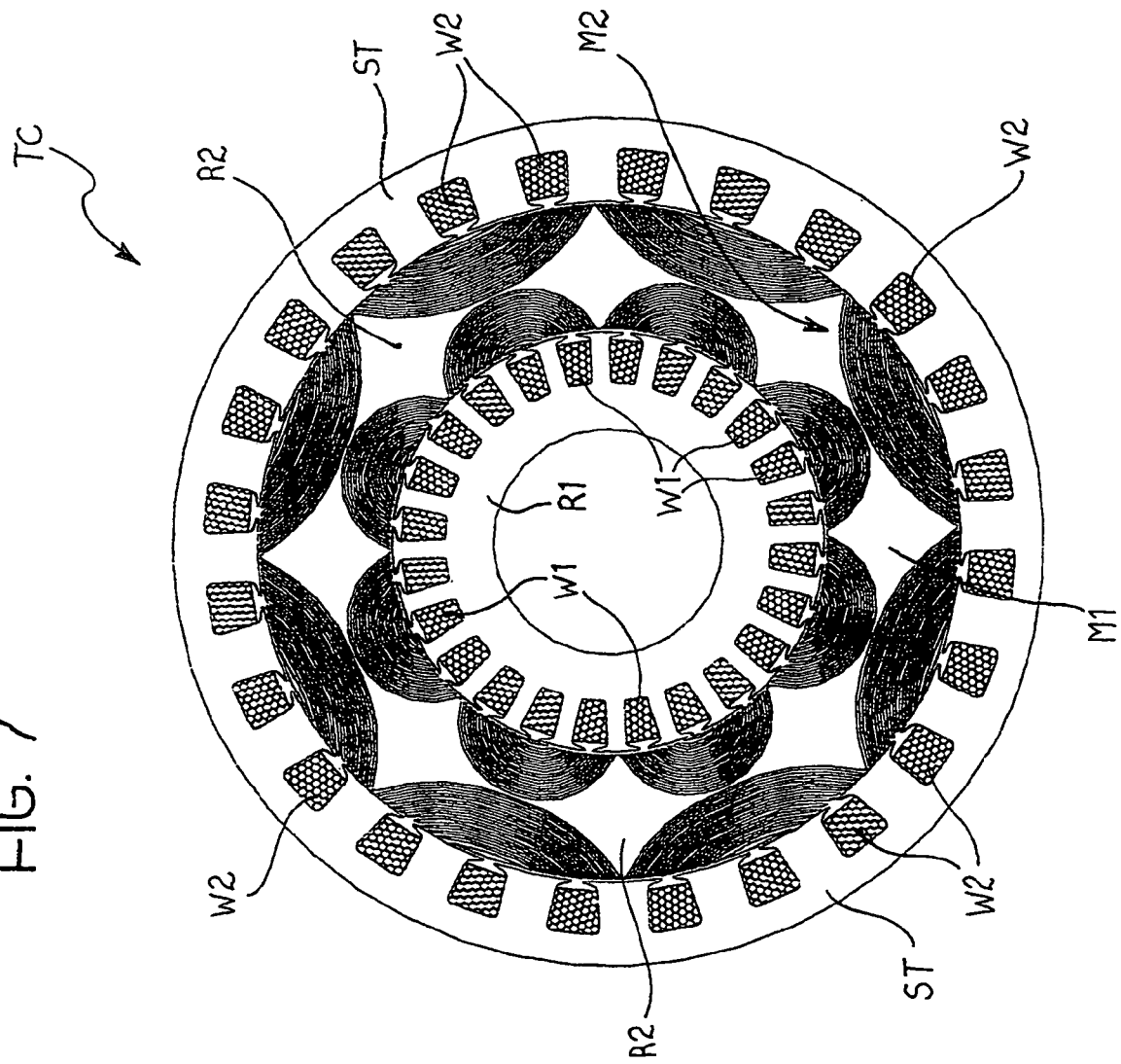

In the embodiments described up to now, the intermediate rotor R2 may be laminated in a transverse direction (plates perpendicular to the axis of rotation), as in the embodiments shown in FIGS. 5 and 6, or may be laminated longitudinally, that is, axially (plates parallel to the axis of rotation), as in the embodiment shown in FIG. 7. This drawing shows a solution in which the inner machine M1 and the outer machine M2 are both of the synchronous reluctance type with axial lamination of the intermediate rotor.

In other embodiments, the inner machine and/or the outer machine may be synchronous reluctance machines according to prior Italian patent 1,276,487, to which reference should be made. In these embodiments, the stator ST and/or the first rotor R1 has an even number $n_s$ of slots per pair of poles, the intermediate rotor R2 has an even number $n_r$ of equivalent slots per pair of poles, and the following relationships apply between the numbers $n_s$ and $n_r$:

$n_s - n_r \neq 0, +2, -2; n_r > 6;$ and $n_s \neq m \cdot n_r$ where $m$ is a whole number.

Preferably $n_s - n_r = \pm 4$

Figure 8:
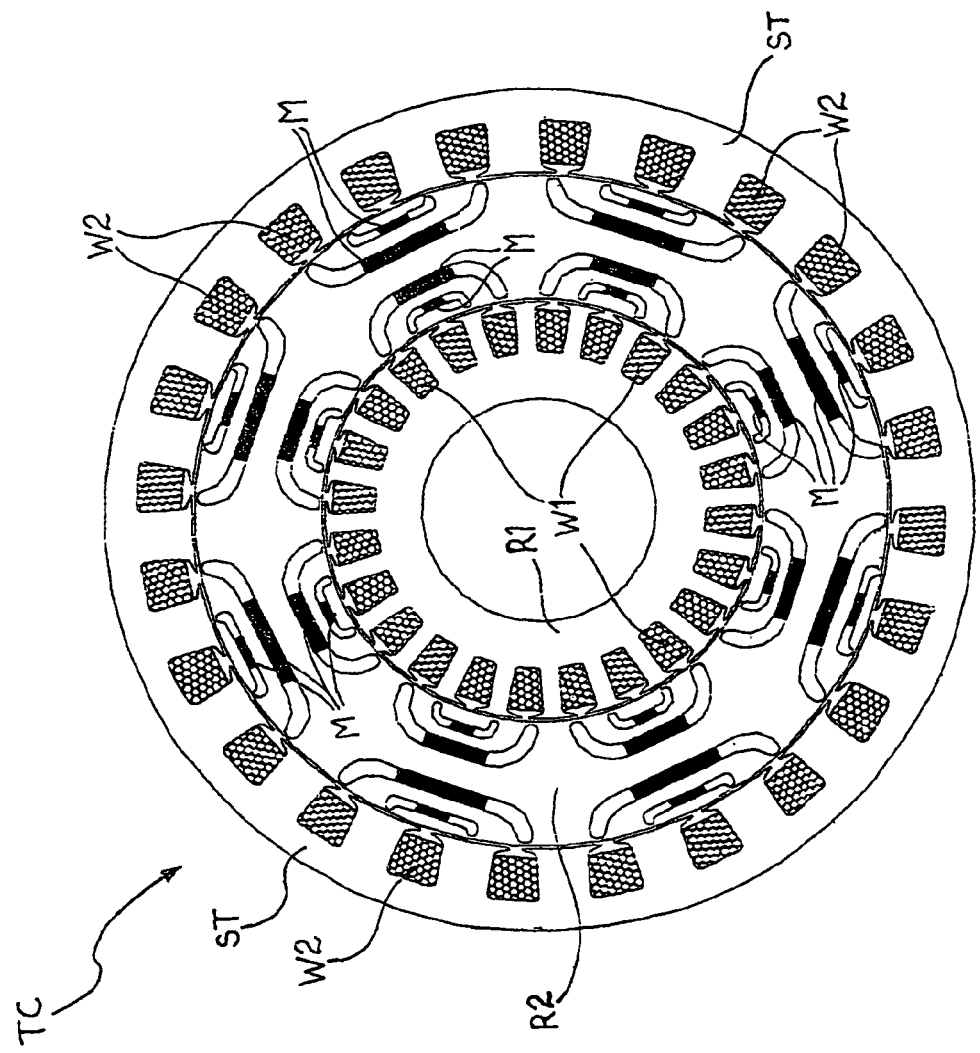

In the embodiments in which one or both of the electrical machines are of the synchronous reluctance type, this or these machines may be provided with phase-advancing magnets. An embodiment of this type is shown in FIG. 8. This drawing shows a solution in which the inner electrical machine M1 and the outer electrical machine M2 are both synchronous reluctance machines and hence substantially of the type of FIG. 6 and the intermediate rotor R2 has permanent phase-advancing magnets M.

In other embodiments, the inner electrical machine M1 and/or the outer electrical machine M2 may be sampled-permeance machines formed in accordance with prior International Patent Application PCT/EP02/02172 to which reference should be made. In the present description as well as in the appended claims, the expression "sampled-permeance machines" means specifically machines formed in accordance with the said prior International Patent Application.

Figure 9:
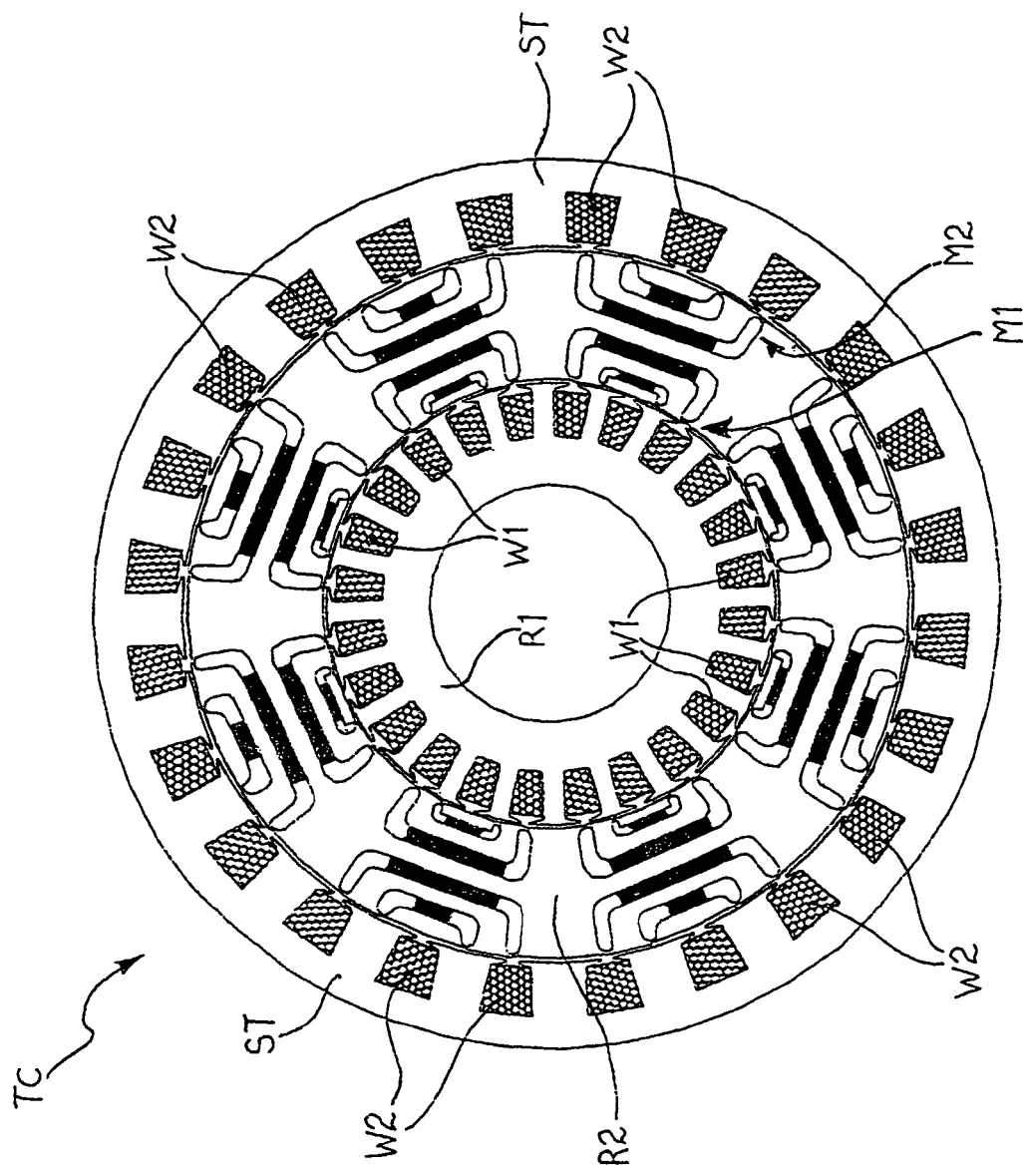

FIG. 9 shows graphically an embodiment of this type in which both of the machines M1 and M2 are sampled-permeance machines.

Figure 10:
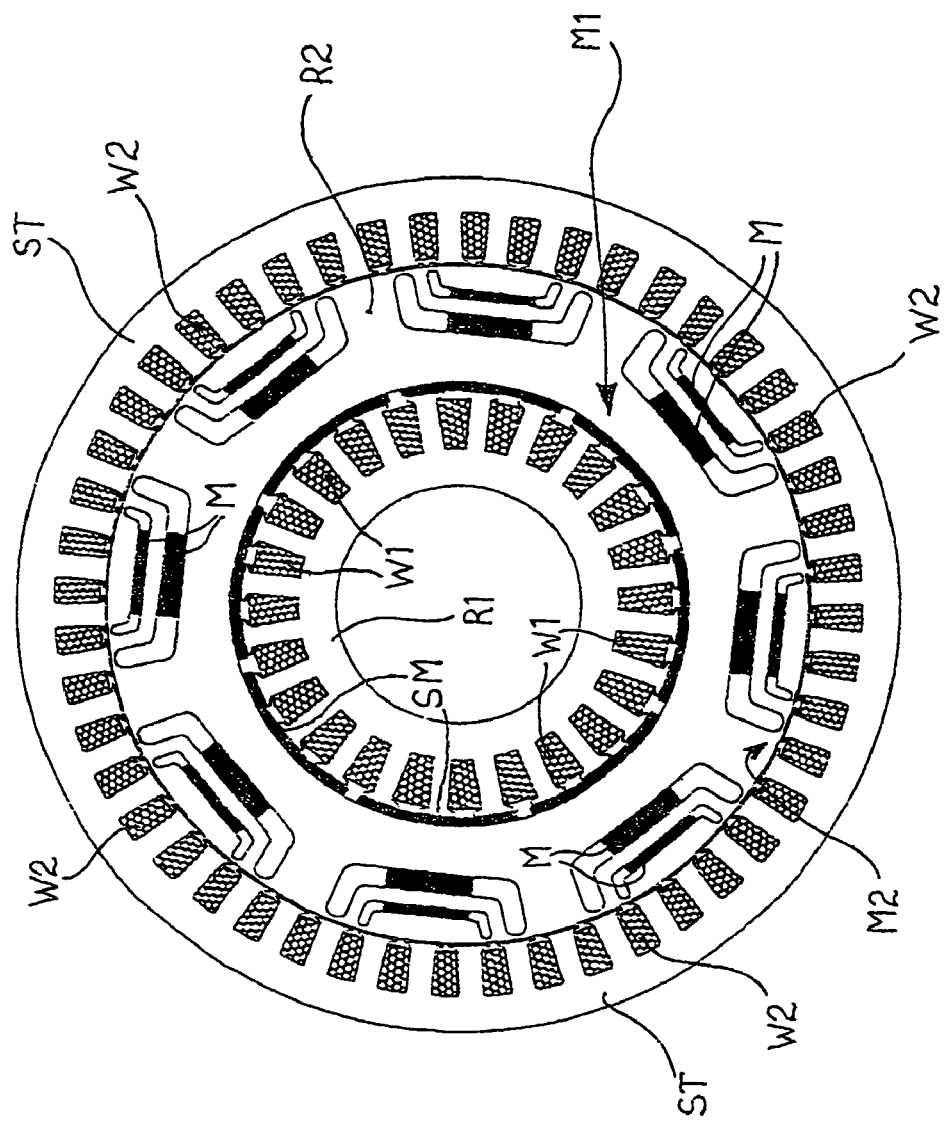

In a further embodiment, the inner machine M1 has surface magnets SM and the outer machine M2 is of the reluctance type (FIG. 10).

Figure 11:
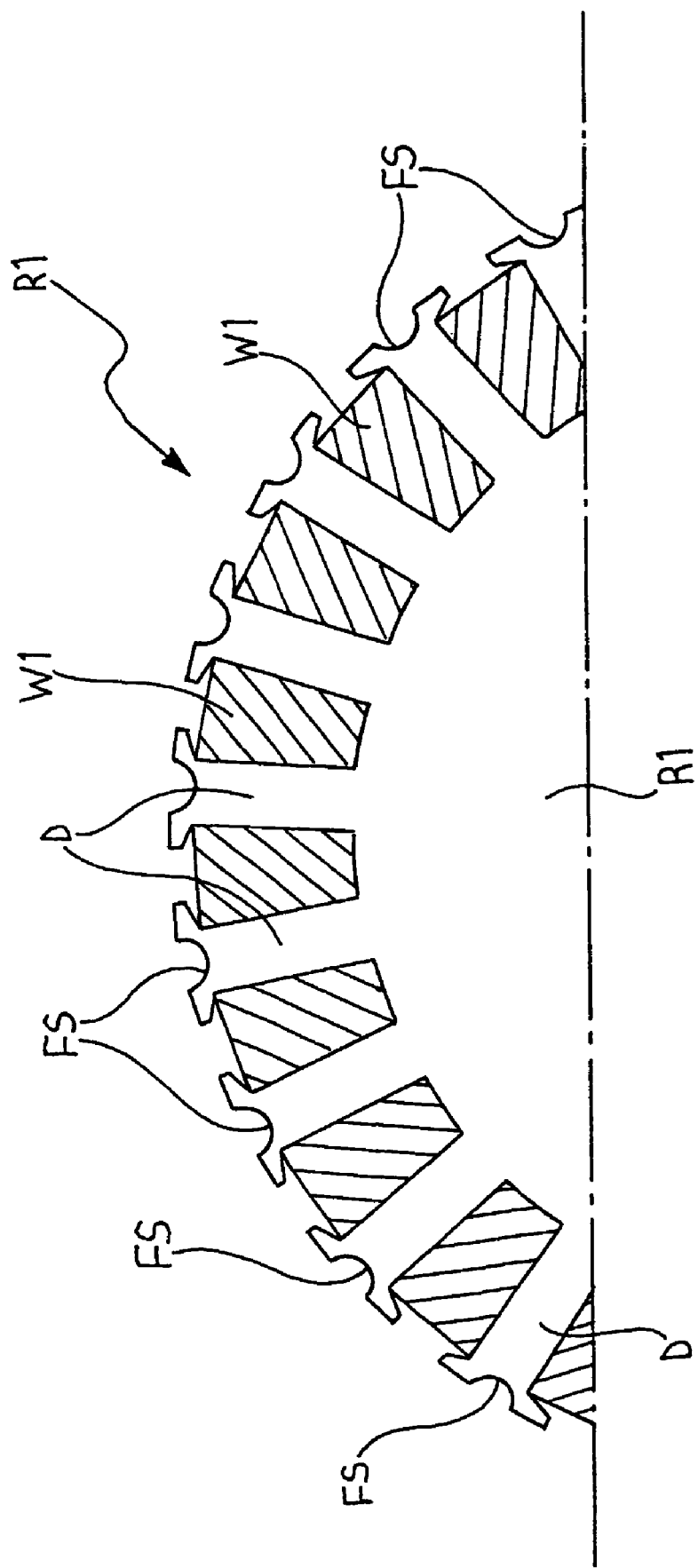

In the embodiment of FIG. 10, the teeth D of the inner rotor R1, which define the slots in which the winding W1 is positioned, may have respective peripheral recesses or grooves FS that are free of conductors or magnets (so-called false slots), facing the air-gap, for reducing cogging, as shown on an enlarged scale in FIG. 11.

Figure 12:
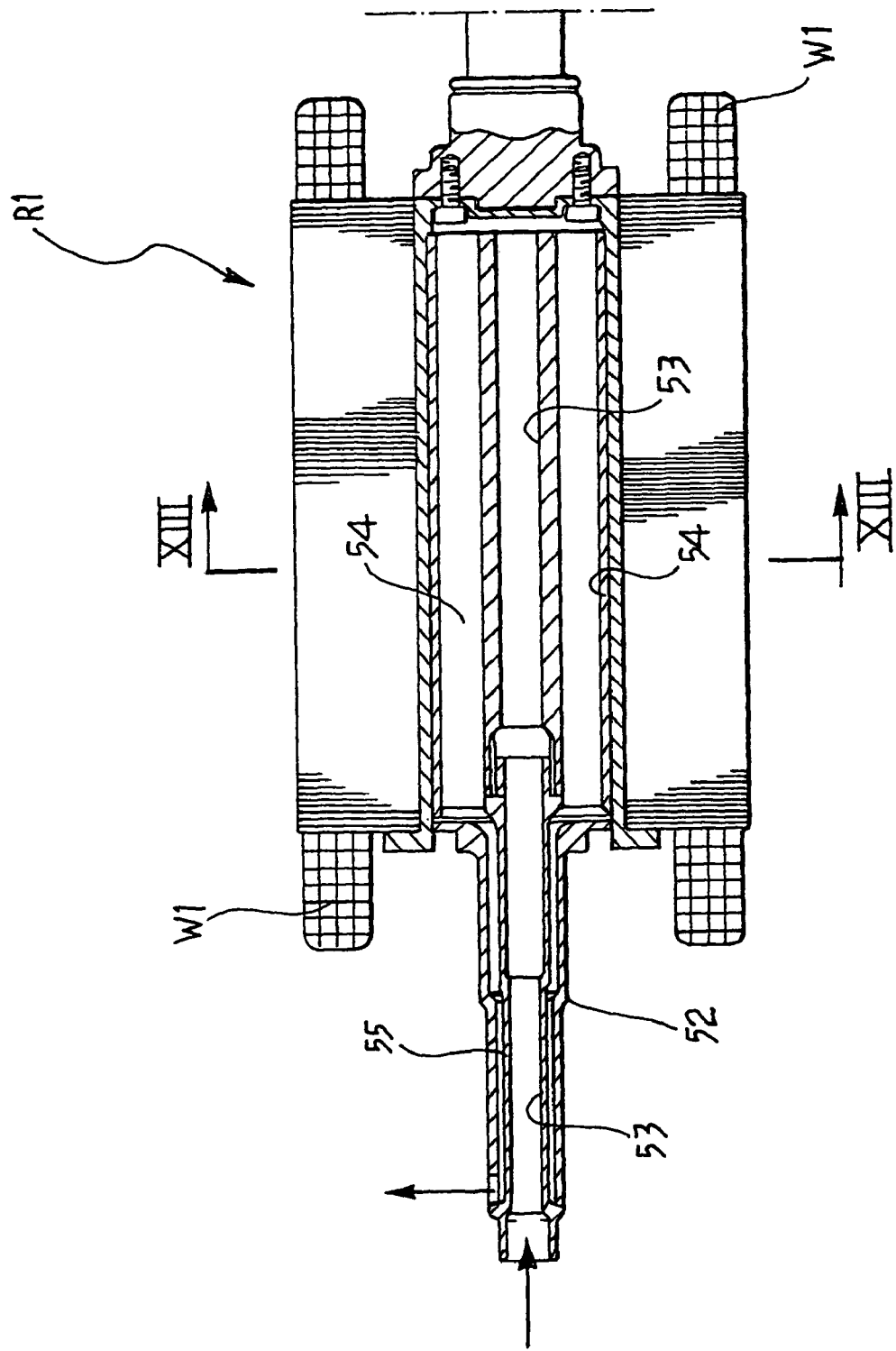
Figure 13:
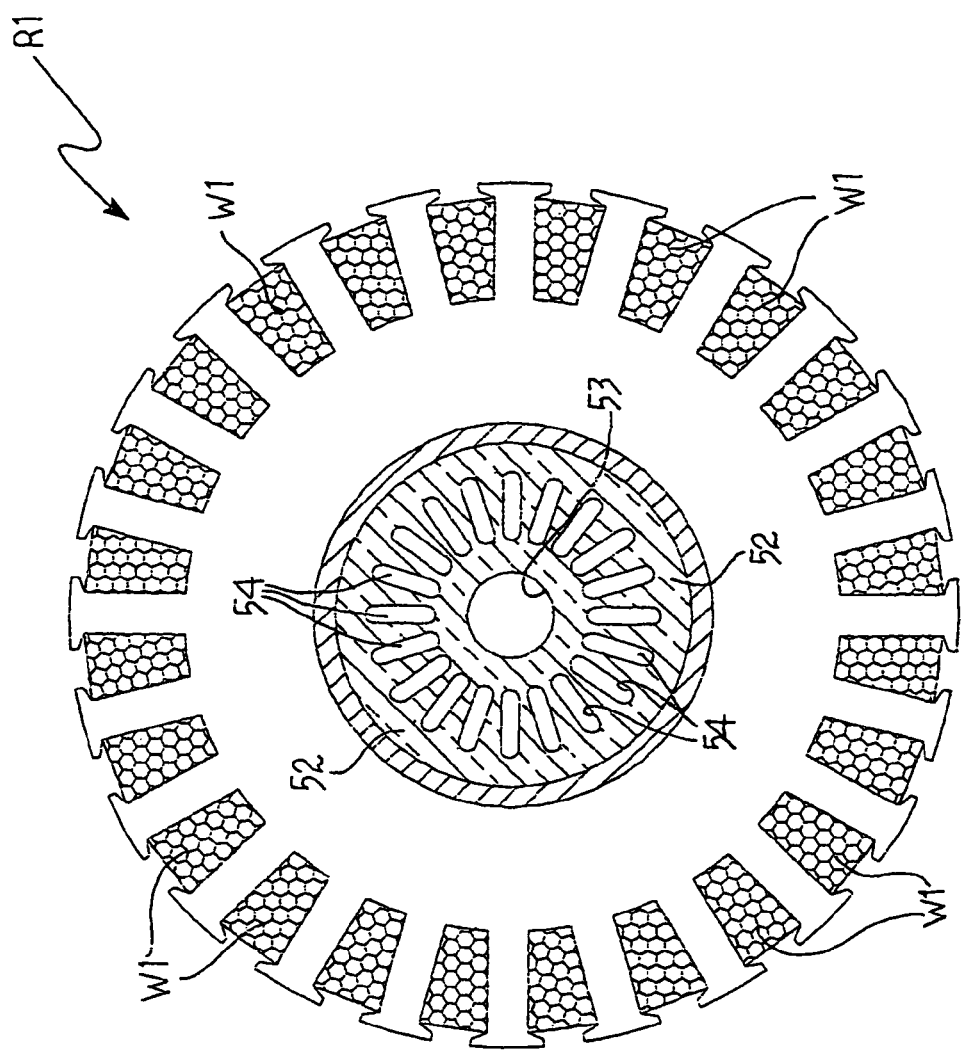

FIGS. 12 and 13 show an embodiment of the inner rotor R1 with cooling by circulation of fluid. The rotor R1 shown therein has a central shaft/hub 52 in which a central axial duct 53 is formed for a flow of coolant fluid. This duct 53 communicates at one end (the right-hand end as seen in FIG. 12) with a plurality of radially outer ducts 54 which surround it. The arrangement is such that, in operation, the coolant fluid flows through the ducts 54 in the opposite direction to the flow in the central duct 53. The outer ducts 54, which in practice are parallel to one another, communicate at one end with an annular manifold 55 which extends around the inlet portion of the central duct 53.

In a variant, not shown, a single annular jacket may be provided instead of the outer ducts 54.

Figure 14:
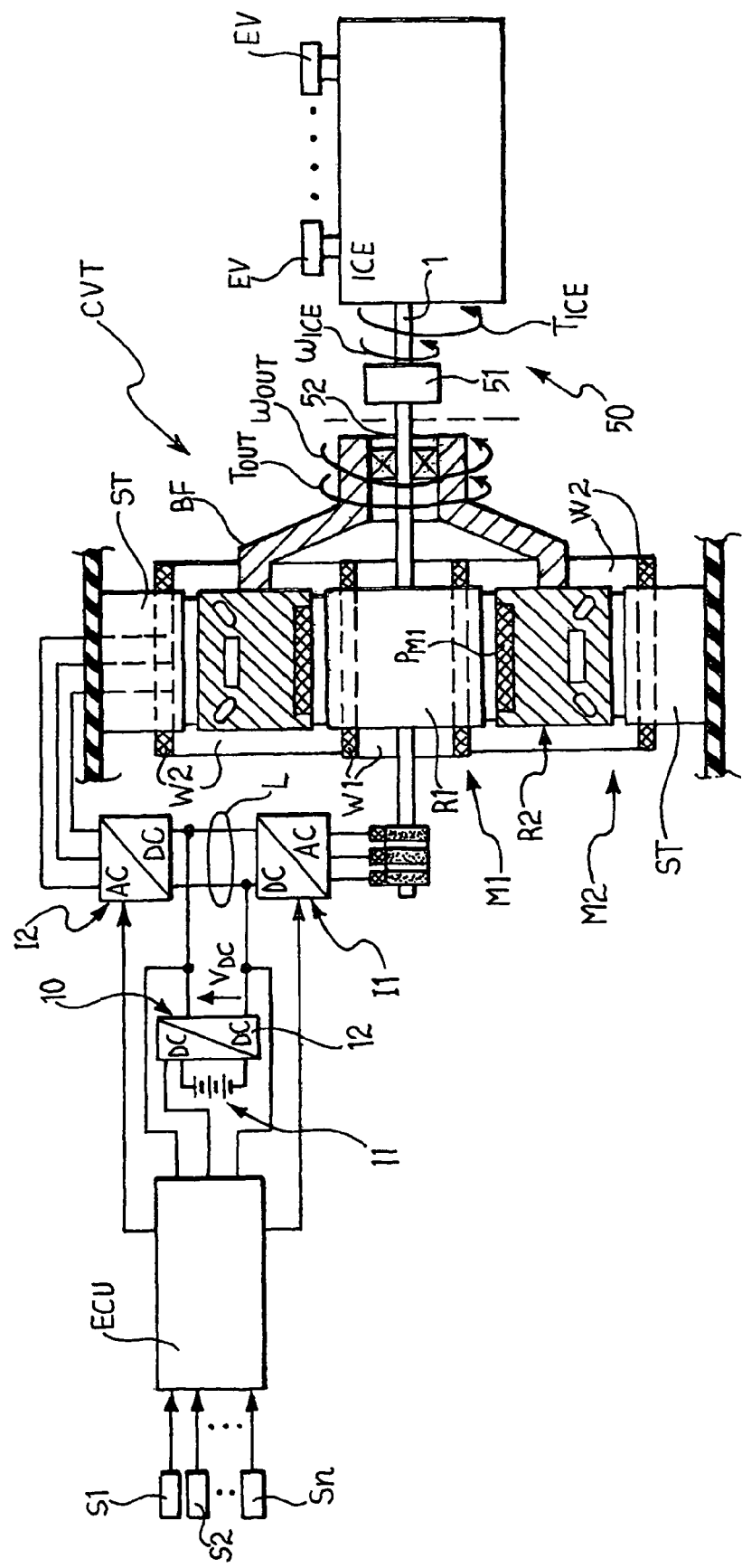

Further reference will now be made to a system according to FIGS. 3, 3a, that is, a system provided with independent electrical-energy storage means. A system of this type can be arranged to bring about starting of the combustion engine ICE by means of the electrical machines M1 and M2 of the unit CVT by using this unit as a motor or torque source. The shaft 1 of the combustion engine ICE is coupled to the shaft 52 (FIG. 14) of the inner rotor R1 of a unit of this type by means of an (optional) torsional ("flexible") coupling 51. The coupling 51 and the shaft 1 of the engine ICE together represent the torsional "load" 50 "seen" by the shaft 52 of the unit CVT, the shaft 52 representing the output of the unit CVT during the operation to start the engine ICE.

The electronic control unit ECU is arranged to bring about rotation of the output 52 of the unit CVT in both directions so that it develops a torque of predetermined value.

In order to start rotation of the torsional load 50, the control unit ECU is arranged, in particular, to bring about activation of the unit CVT in a manner such that the output 52 thereof rotates in a predetermined initial direction and applies to the load 50 a torque $T_{OUT}$ having a predetermined value $T_{start}$. The value of the initial torque $T_{start}$ is less than the value necessary to cause rotation of the load 50 to start and, in particular, less than the value necessary to bring about the so-called "breakaway" or "release" of the internal combustion engine, that is, to overcome the forces which oppose the movement of the pistons in the cylinders. The value of the torque $T_{start}$ is however sufficient to bring about a condition of resilient torsion of the load 50, that is, of the unit formed by the torsional coupling 51 and by the shaft 1 of the engine ICE.

The application of the torque $T_{start}$ to the load 50 thus brings about a storage of elastic energy therein. The amount of torsion produced in the load increases up to a maximum value which corresponds substantially to the reduction to zero of the angular velocity $\omega_{OUT}$ of the output 52 of the unit CVT. This velocity can be detected by means of a sensor Sx connected to an input of the control unit ECU.

Figure 15:
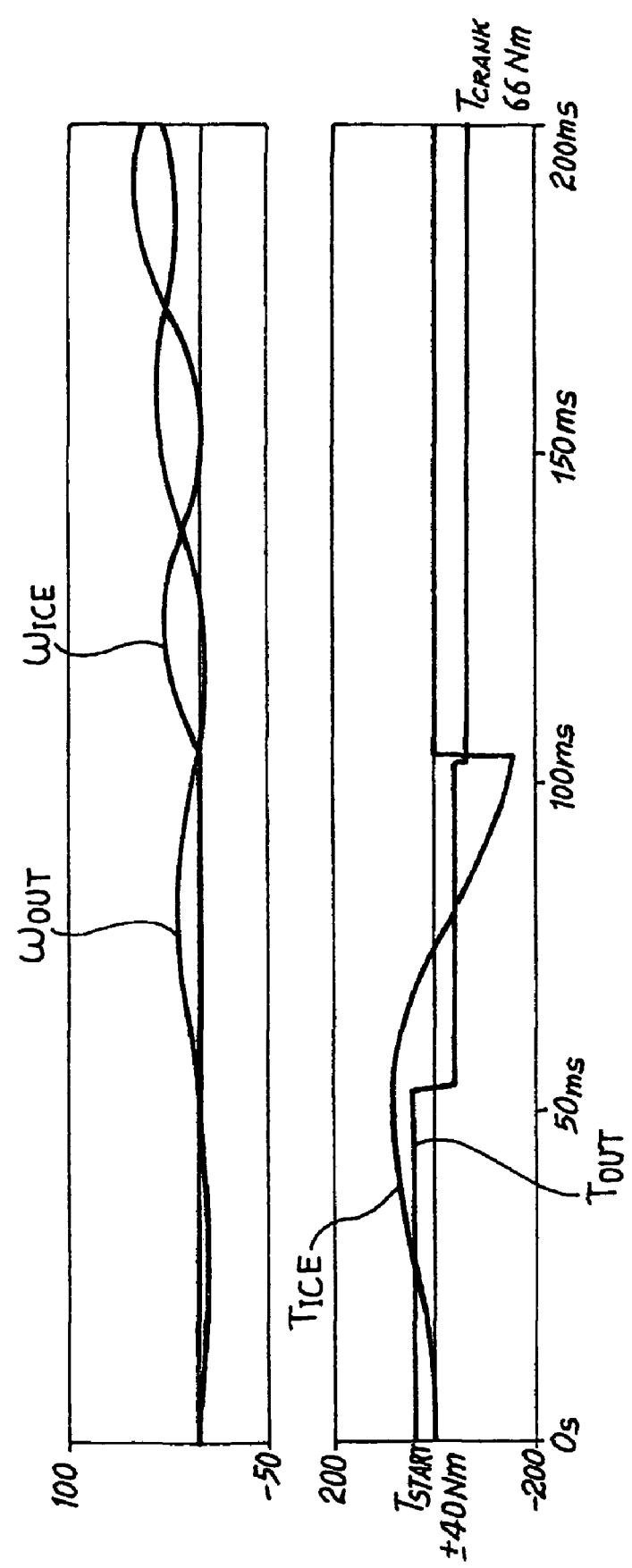

As soon as the angular velocity $\omega_{OUT}$ of the output 52 of the unit CVT falls to a predetermined value during the application of the torque $T_{start}$ to the load 50 in the above-mentioned initial direction, the control unit ECU drives the unit CVT in a manner such that its output 52 now rotates in the opposite direction to the previous direction and develops a predetermined torque $T_{OUT}$ (now having, for example, a value Tstart). The load 50 is thus subjected to a resultant torque substantially corresponding to the sum of the torque $T_{OUT}$ now developed by the unit CVT and of the twisting moment generated by the resilient return of the load 50 from the previous resilient torsion condition. If this resultant torque is sufficient to bring about "breakaway" of the pistons from the surfaces of the cylinders, rotation of the engine ICE is started. The corresponding angular velocity and torque curves are shown by way of example in the qualitative graphs of FIG. 15. In this figure the velocity of the output 52 of the unit CVT is indicated $\omega_{OUT}$ and the angular velocity of the shaft 1 of the engine ICE is indicated $\omega_{ICE}$. Moreover, the torque developed by the unit CVT is indicated $T_{OUT}$ and the torque applied to the shaft 1 of the engine ICE is indicated $T_{ICE}$.

In some situations, it is not sufficient to activate the torque unit CVT once in reverse and once forwards as described above in order to succeed in bringing about "breakaway", that is, to start rotation of the load.

Figure 16:
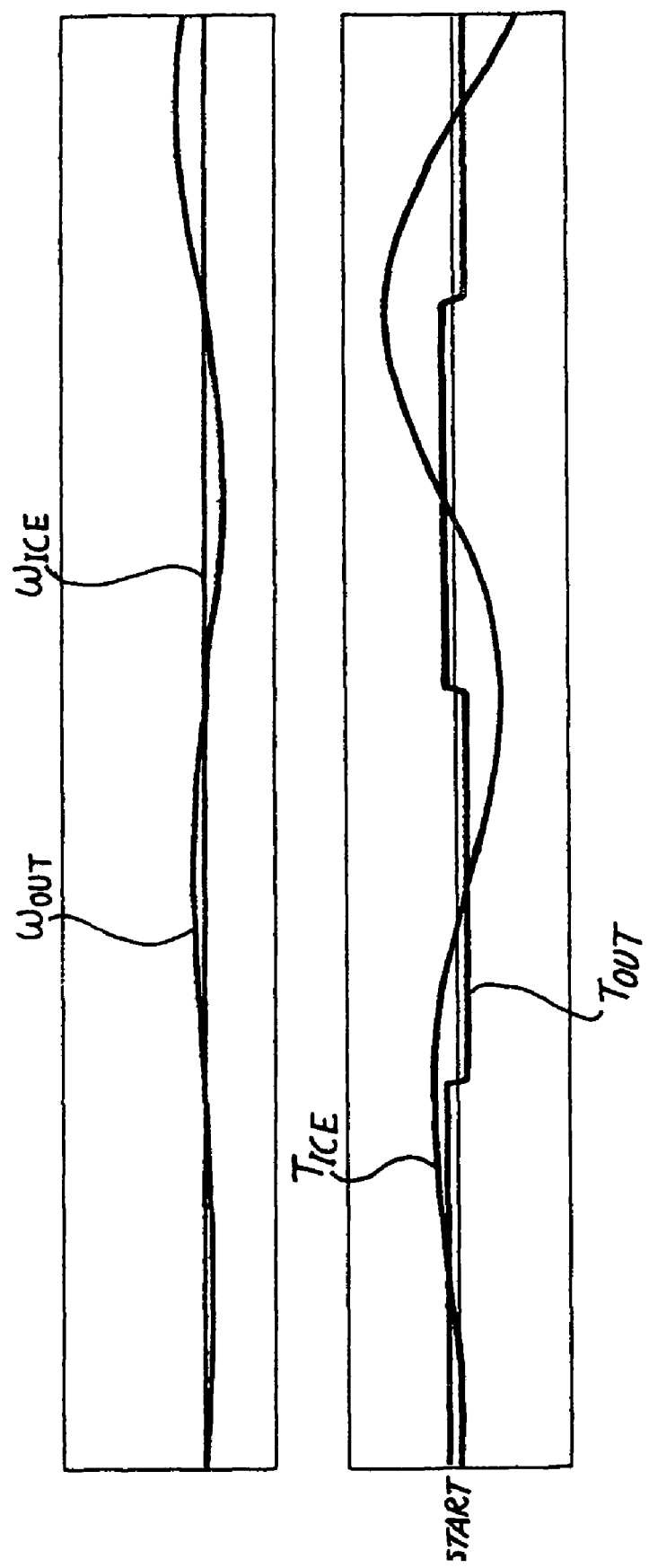

The control unit ECU may then advantageously be arranged to activate the unit CVT so as to apply to the load 50 successive torque pulses of alternating sign, and hence alternately forwards and in reverse, suitably in time with the detected curve of the angular velocity $\omega_{OUT}$ of the output 52 of that unit so that, for each reversal of the sign of the torque $T_{OUT}$, the load 50 is subjected to a new resultant torque corresponding to the sum of the torque momentarily applied by the unit CVT and of a gradually increasing twisting moment generated by the resilient return of the load from the previous resilient torsion condition. A type of "amplification" effect on the torque TIC applied to the shaft of the internal combustion engine ICE is thus created, as shown by way of example and qualitatively in the graphs of FIG. 16.

The application to the load 50 of a torque "square wave" suitably in time with the angular velocity $\omega_{OUT}$ of the output of the torque source thus causes the torque $T_{ICE}$ applied to the shaft of the internal combustion engine to "diverge" progressively until starting of the engine is achieved.

For an internal combustion engine, the starting operation comprises, after the initial "breakaway" stage, a second stage in which the rotation is accelerated until the so-called self-sustaining speed is reached.

In this second stage, starting is hindered by the fact that the resisting torque $T_R$ has values which are greatly variable with the angular position θ and would require the availability of a source of torque of a high value, greater than the maximum value of the resisting torque $T_R$.

Figure 17:
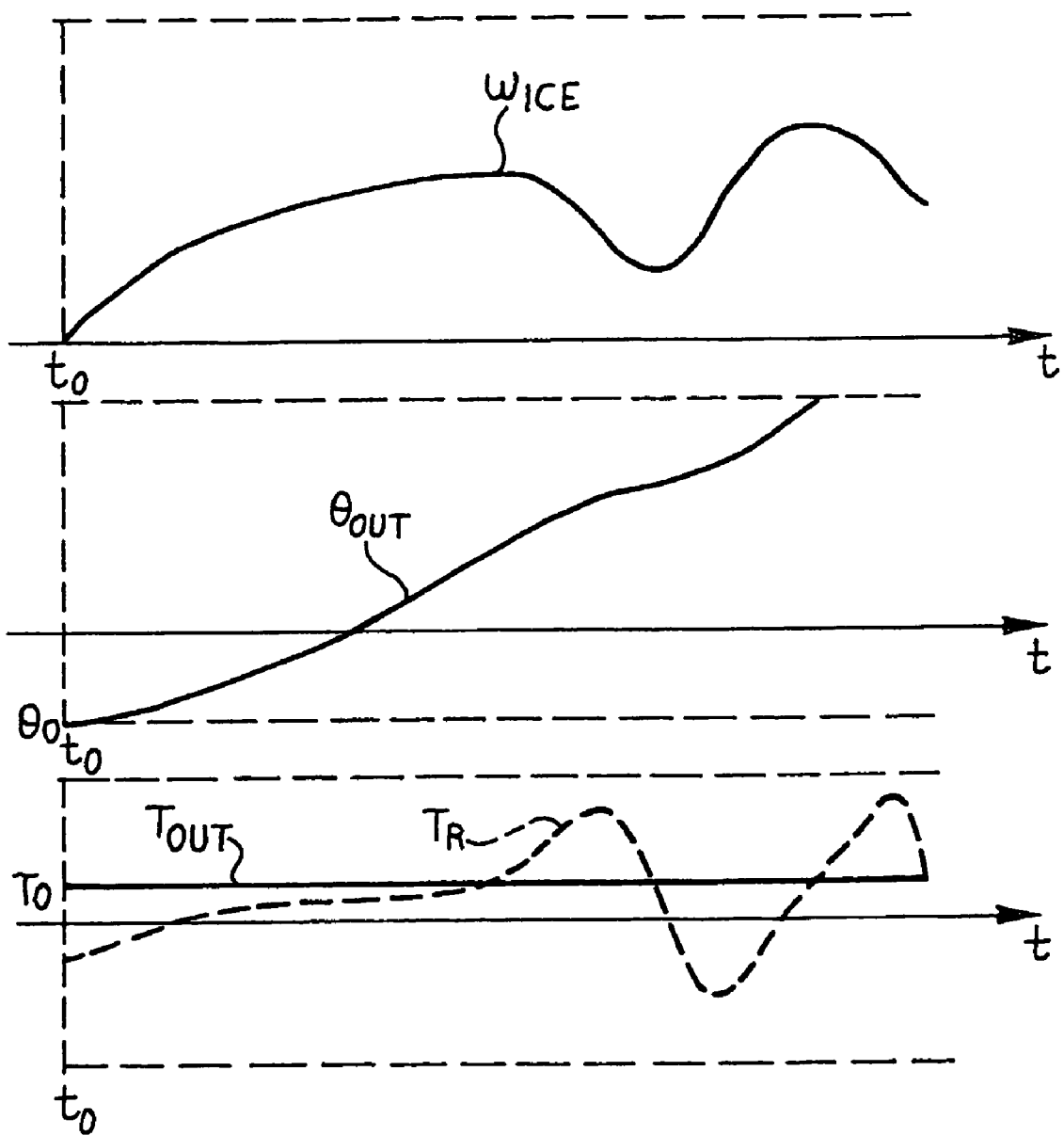

To facilitate acceleration of the engine in this second stage, the unit CVT is therefore activated in the opposite direction to the normal direction of rotation envisaged for the shaft 1 of the engine ICE for a limited angular displacement and with a predefined low torque $T_0$ (see the graphs of FIG. 17 at time $t_0$).

The unit CVT is then activated in the normal direction of rotation of the shaft of the engine ICE.

This enables two advantages to be achieved.

A first advantage is an increase in the angular displacement of the shaft 1 in order to reach the first position of maximum resisting torque TR (T.D.C.—top dead centre).

The second advantage is the storage of (pseudo)-elastic energy which can be achieved as a result of the compression of the gas in one or more of the cylinders which have their intake/exhaust valves closed at this stage.

The graphs of FIG. 17 show examples of time curves of some quantities, starting from the time $t_0$ at which the second stage of the starting procedure begins.

Naturally, the principle of the invention remaining the same, the forms of embodiment and details of construction may be varied widely with respect to those described and illustrated purely by way of non-limiting example, without thereby departing form the scope of the invention as defined in the appended claims.

The invention claimed is:

1. A transmission system with a continuously variable transmission ratio, particularly for a motor vehicle provided with an internal combustion engine, comprising:
    a first rotary electrical machine including a first rotor provided with a multiphase winding and fixed for rotation with the shaft of the internal combustion engine, and a second rotor or intermediate rotor arranged coaxially with the first rotor and carrying first magnetic means operatively cooperating with the winding of the first rotor, the intermediate rotor being coupled mechanically with at least one axle of the motor vehicle, and
    a second rotary electrical machine coaxial with the first and including a stator, which is arranged on the opposite side of the intermediate rotor to the first rotor and is provided with a multiphase winding, as well as the intermediate rotor which also carries second magnetic means operatively cooperating with the winding of the stator,
    a first inverter and a second inverter having respective alternating-current sides connected to the winding of the rotor and to the winding of the stator, respectively, and respective direct-current sides connected in parallel with one another by means of a d.c. voltage link,
    sensor means suitable for providing electrical signals indicative of the values adopted by a plurality of predetermined parameters indicative of predefined operating conditions of the internal combustion engine and of the motor vehicle, and
    electronic control means connected to the sensor means as well as to the inverters and arranged to control the operation of the inverters in a manner such that, after the internal combustion engine has been started, the voltage in the d.c. voltage link is regulated to a predetermined value which is variable in accordance with predetermined procedures in dependence on the values of the parameters monitored by the sensors;
    wherein the electronic control means are arranged to drive the inverters in a manner such that the voltage in the d.c. voltage link is regulated to the minimum value necessary to impart the desired current values to the windings in operation.

2. A system according to claim 1 in which the first and second electrical machines are formed in a manner such that:
    if r indicates the ratio $\omega_{MAX}/\omega_{base}$, where $\omega_{MAX}$ is the maximum angular velocity of the output, that is, of the intermediate rotor, and $\omega_{base}$ is the angular velocity of the intermediate rotor, starting from which a torque equal to a predetermined maximum value is to be applied to the wheels of the axle, and
    if b indicates the ratio $\omega_{MAX}/\omega_{ICE,MAX}$ is the rate of rotation of the shaft of the internal combustion engine at which the engine delivers the maximum power,
    b is substantially equal to $2r/(r+1)$.

3. A system according to claim 1 in which auxiliary electrical-energy storage means, controlled by the electronic control means predetermined procedures, are connected to the d.c. voltage link.

4. A system according to claim 3 in which the auxiliary energy storage means comprise electrical accumulators to which a bidirectional d.c./d.c. converter is connected.

5. A system according to claim 4 in which the d.c./d.c. converter is of the back-boost type.

6. A system according to claim 5 in which the d.c./d.c. converter is of the step-up type.

7. A system according to claim 1 in which the first and second electrical machines are reluctance machines.

8. A system according to claim 7 in which at least one of the first electrical machine and the second electrical machine are of the "switched reluctance" type.

9. A system according to claim 7 in which at least one of the first electrical machine and the second electrical machine are of the synchronous or variable reluctance type.

10. A system according to claim 9 in which the intermediate rotor is laminated in a transverse direction.

11. A system according to claim 10 in which at least one of the stator and the first rotor has a number equal to $n_s$ of slots per pair of poles and the intermediate rotor has a number equal to $n_r$ of equivalent slots per pair of poles, the following relationships between the numbers $n_s$ and $n_r$ being true:

$$n_s - n_r \neq 0, +2, -2; n_r > 6; \text{ and } n_s \neq m \cdot n_r \text{ where } m \text{ is a whole number.}$$

12. A system according to claim 11 in which $n_s - nr = \pm 4$.

13. A system according to claim 9 in which the intermediate rotor is laminated in a longitudinal, that is, axial direction.

14. A system according to claim 9 in which the intermediate rotor is provided with phase-advancing magnets.

15. A system according to claim 7 in which at least one of the first electrical machine and the second electrical machine is of the sampled-permeance type.

16. A system according to claim 7 in which the first rotor has a plurality of permanent magnets on its surface facing the second rotor.

17. A system according to claim 16 in which each tooth of the first rotor has at least one peripheral groove or recess which faces the intermediate rotor and is free of conductors or magnets.

18. A system according to claim 7 in which the first rotor has a shaft in which a central duct is formed for a flow of coolant fluid, one end of the central duct communicating with at least one radially outer duct in which the coolant fluid flows in the opposite direction to the flow in the central duct, in operation.

19. A system according to claim 3, in which the control means are arranged:
    to activate the unit comprising the electrical machines such that an output of the unit rotates in a predetermined initial direction and applies to the load a torque ($T_{OUT}$) having a value ($T_{start}$) lower than the value necessary to cause rotation of the load to start but sufficient to bring about a condition of resilient torsion of the load, and
    to activate the unit, whilst the load is subject to the torsion, such that the output of the unit rotates in the opposite direction to the previous direction and develops a predetermined torque so that the load is subjected to a first resultant torque substantially corresponding to the sum of the torque from the unit and of the twisting moment generated by the resilient return of the load from the above-mentioned resilient torsion condition.

20. A system according to claim 19 in which the unit is then activated again in the initial direction whilst the load is in a new condition of resilient torsion induced by the first resultant torque so that the load is now subjected to a new or second resultant torque substantially corresponding to the sum of the torque now developed by the unit and of the twisting moment generated by the resilient return of the load from the new resilient torsion condition.

21. A system according to claim 19 in which the unit is activated in the opposite direction to the previous direction, on each occasion, when the angular velocity of the output of the unit falls to a predetermined value during the application of torque to the load in the previous direction.

22. A system according to claim 19 in which the engine comprises at least one cylinder provided with intake/exhaust valves and in which, after the shaft of the engine has started to rotate, the unit is activated, in a first stage, in the opposite direction to the normal direction of rotation of the shaft of the engine for a limited angular displacement and with a predefined low torque, and then the unit is activated in the normal direction of rotation of the shaft so as to increase the angular displacement available before the shaft reaches the first top dead centre position and to utilize any conditions of pseudo-elastic compression of the gas contained in at least one cylinder which has its intake/exhaust valves closed during the said first stage, so that there is added to the torque now applied to the shaft by the unit a twisting force in the same direction generated by the return of the gas from the pseudo-elastic compression condition.

* * * * *